United States Patent [19]

Lindner

[11] 4,095,773

[45] Jun. 20, 1978

[54] SUBASSEMBLIES FOR CUBE CORNER TYPE RETROREFLECTOR MOLDS

[75] Inventor: Henry Lindner, Elgin, Ill.

[73] Assignee: Beatrice Foods Co., Elgin, Ill.

[21] Appl. No.: 825,245

[22] Filed: Aug. 17, 1977

Related U.S. Application Data

[62] Division of Ser. No. 743,055, Nov. 18, 1976.

[51] Int. Cl.² .................. B29C 1/00; B29D 11/00
[52] U.S. Cl. ........................ 249/117; 425/808; 249/160
[58] Field of Search .......... 425/805, 808; 249/117, 249/160

[56] References Cited

U.S. PATENT DOCUMENTS

| | | | |
|---|---|---|---|
| 1,591,572 | 7/1926 | Stimson | 425/808 |
| 3,069,721 | 12/1962 | Arni et al. | 425/808 |
| 3,125,776 | 3/1964 | Lilley | 425/805 |
| 3,128,488 | 4/1964 | Schad | 425/808 |
| 3,173,177 | 3/1965 | Rybko | 425/805 |
| 3,357,058 | 12/1967 | Kutik | 425/805 |
| 3,363,875 | 1/1968 | Hedgewick et al. | 425/808 |
| 3,417,959 | 12/1968 | Schultz | 425/808 |
| 3,443,281 | 5/1969 | Walby | 425/808 |
| 3,541,216 | 11/1970 | Rochlis | 425/805 |
| 3,541,606 | 11/1970 | Heenan et al. | 425/808 |
| 3,649,153 | 3/1972 | Brudy | 425/808 |
| 3,811,647 | 5/1974 | Pink | 425/808 |
| 3,899,154 | 8/1975 | Tanoka | 425/808 |
| 3,926,402 | 12/1975 | Heenan | 425/808 |

FOREIGN PATENT DOCUMENTS 156,406  5/1954  Australia .............. 425/808

Primary Examiner—J. Howard Flint, Jr.
Attorney, Agent, or Firm—Hill, Gross, Simpson, Van Santen, Steadman, Chiara & Simpson

[57] ABSTRACT

Slab shaped bodies are individually prepared by machining and then are assembled into mold portions which portions are adapted for incorporation into a mold for forming cube-corner type retroreflective surfaces in a body formed by such a mold. Two such slab shaped bodies in side by side relationship cooperate to provide a plurality of individual cube corner type retroreflective units extending along adjoining top side edge wall portions of such bodies. A plurality of such slab-shaped body pairs are employable to provide a region of cube corner type retroreflective units. Such slab shaped bodies make possible a variety of new and useful retroreflectors.

25 Claims, 37 Drawing Figures

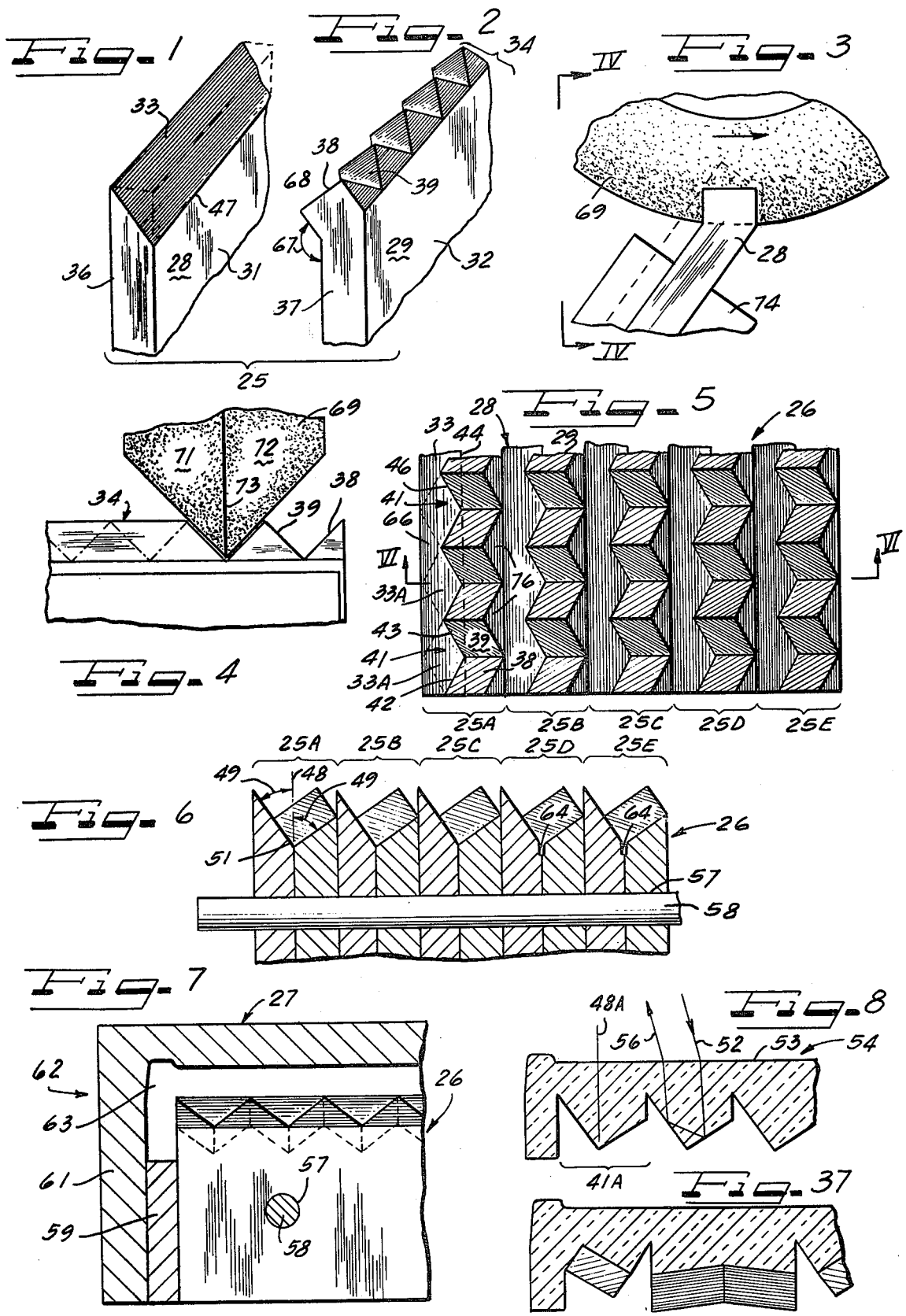

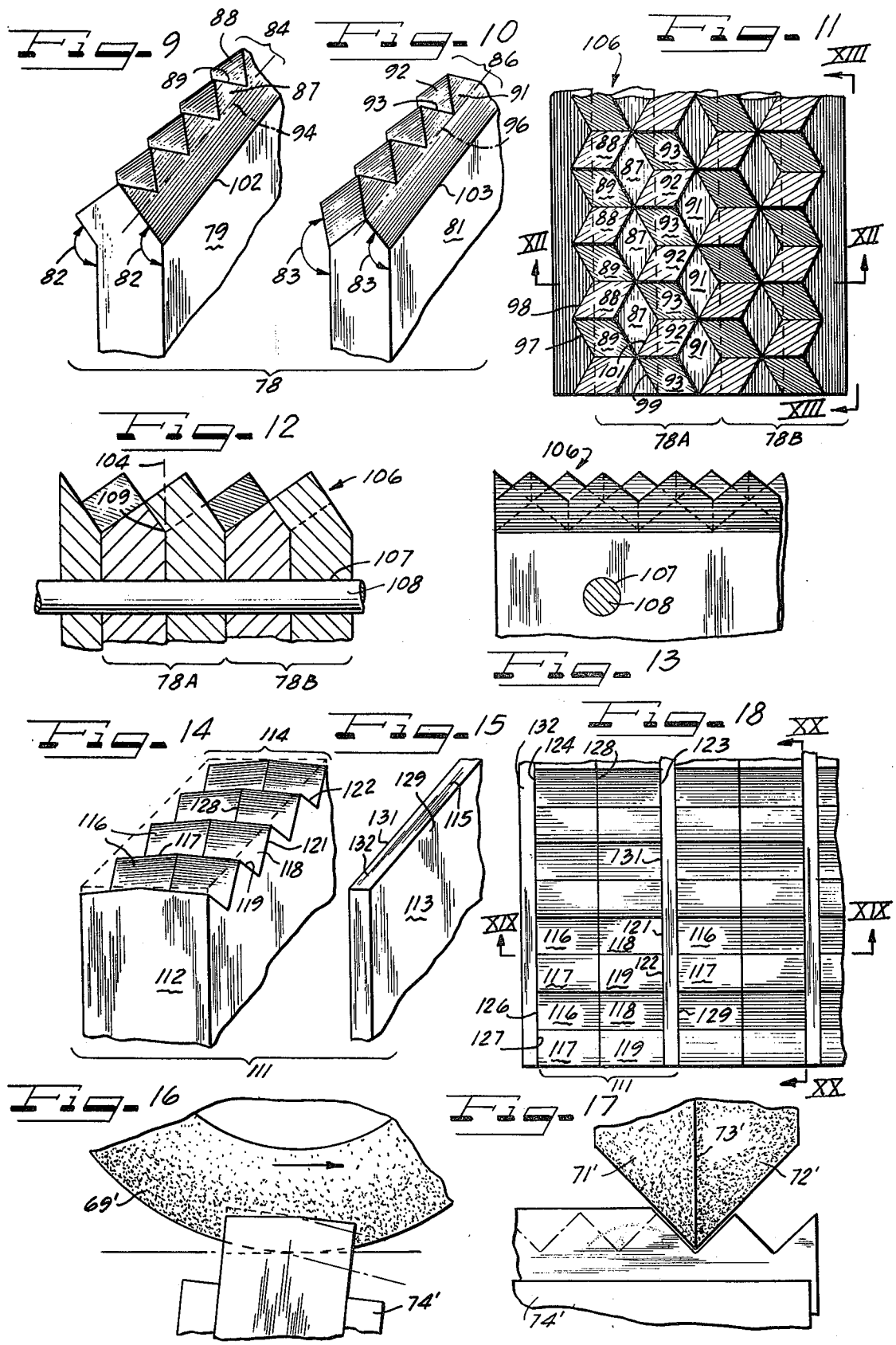

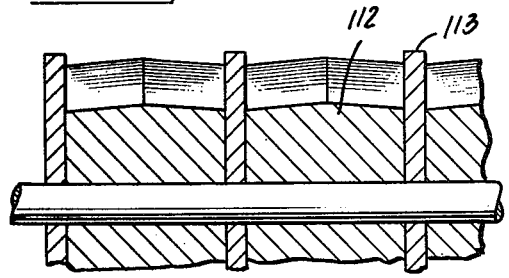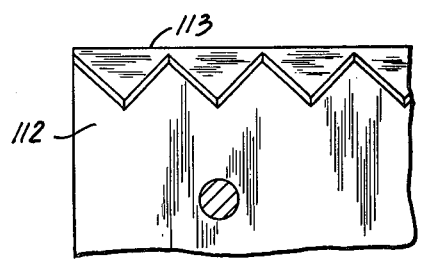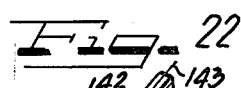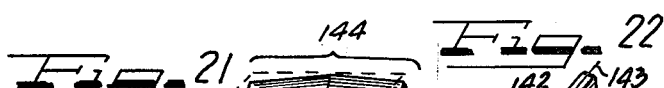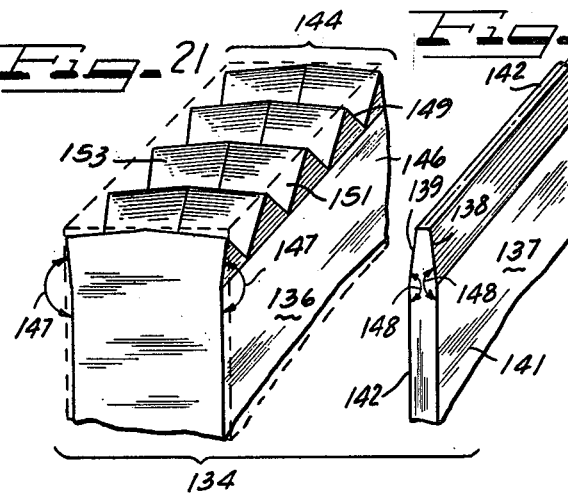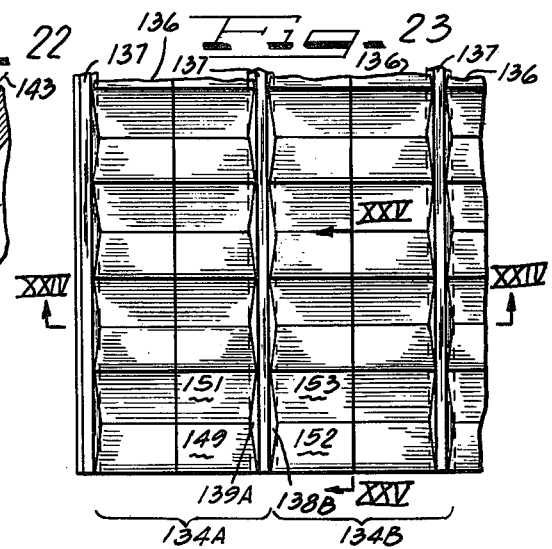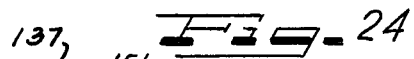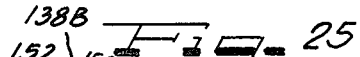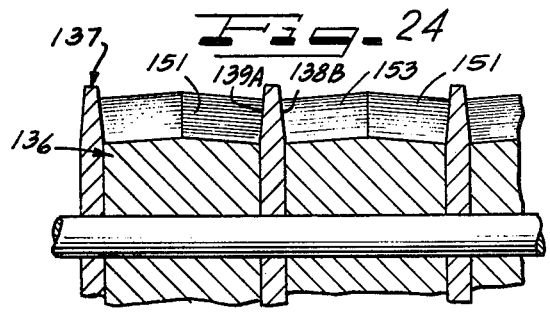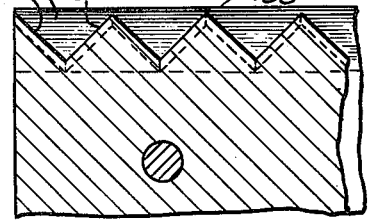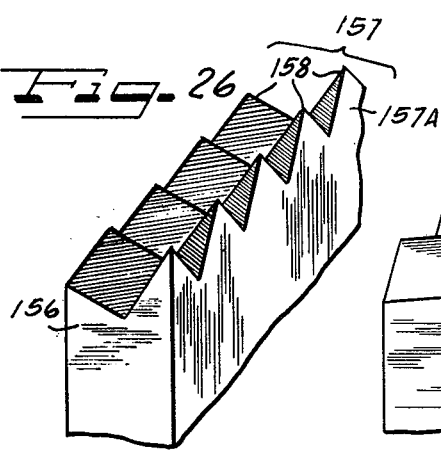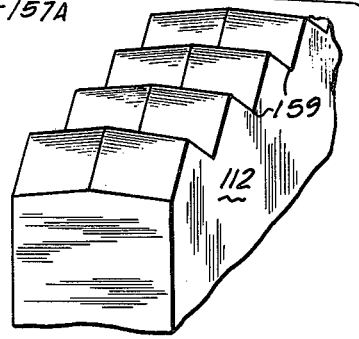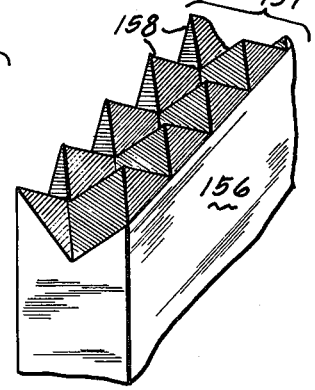

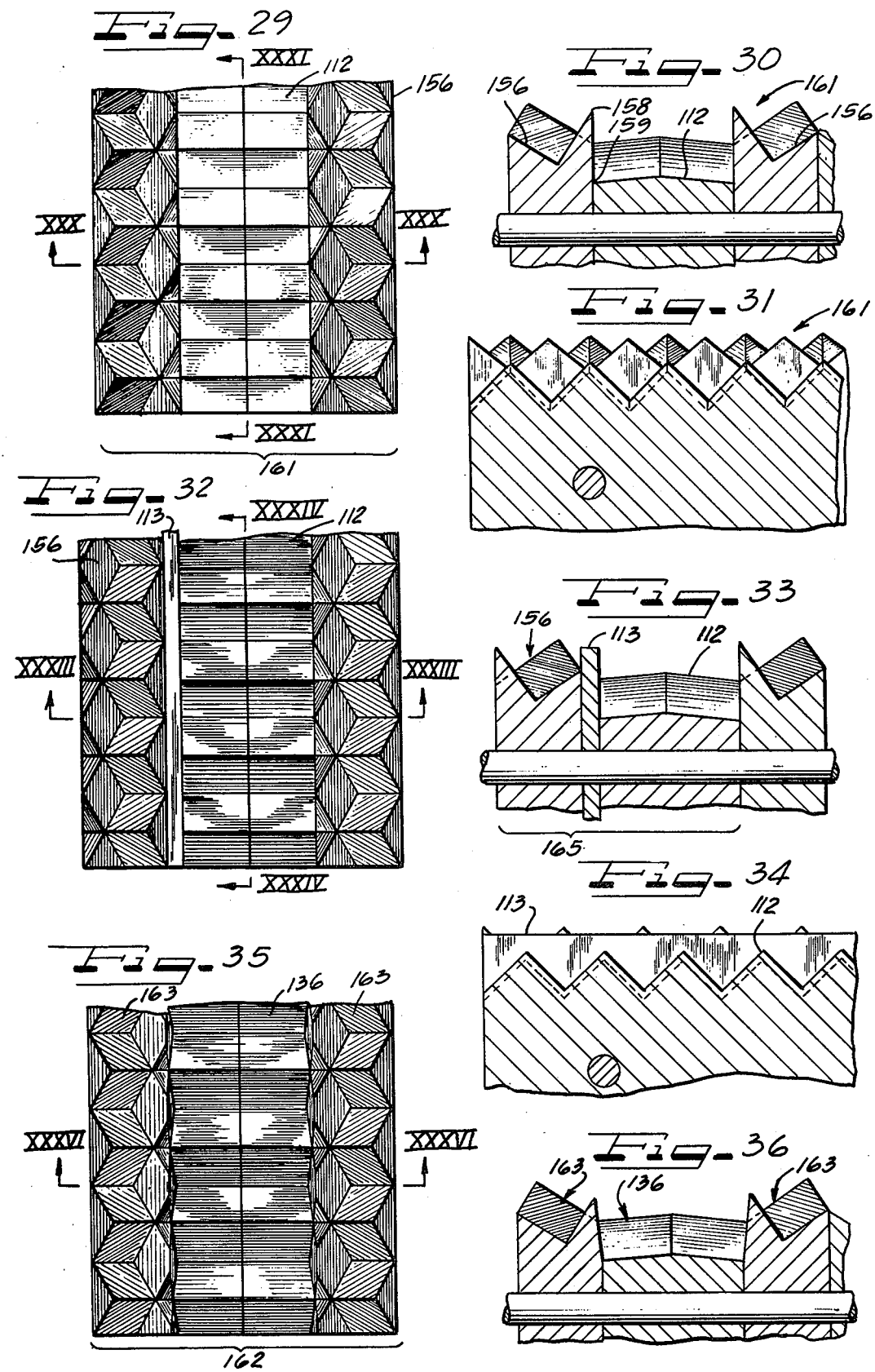

SUBASSEMBLIES FOR CUBE CORNER TYPE RETROREFLECTOR MOLDS

This is a division, of application Ser. No. 743,055, filed Nov. 18, 1976.

BACKGROUND OF THE INVENTION

In the art of cube corner type retroreflectors, it has heretofore been the practice to produce the precisely formed and precisely positioned individual three faces comprising a single complete unit capable of retroreflecting incoming light rays striking such unit within a predetermined range of entrance angles as an integral body incorporating a plurality of similar such units. The manufacturing procedure involves starting with preformed metal pins, usually hexagonally sided, and grinding on each pin into three precisely formed and angled faces. A plurality of such resulting pins are then formed into a bundle, and an electroform is prepared using the face of the pin bundle incorporating the ground pin ends. In this way, a large number of cube corner retroreflective units per square centimeter of surface area can be formed in the region of a mold being used to form a back face of an individual cube-corner type reflector body, as those skilled in the art appreciate.

The manufacture of electroforms for cube-corner type reflector bodies thusly is inherently an expensive, time consuming undertaking making product molds for cube corner type retroreflectors inherently expensive to produce. The art would like to have a capability for directly making the portions of a reflector mold containing cube corner faceted units without the necessity of going through the route of pin grinding and electroform manufacture from pin bundles. So far as is now known, no one has heretofore succeeded in making reflector mold portions with cube corner type retroreflective faceted units formed therein by direct assembly of preformed strips slabs of metal bodies arranged in side-by-side relationship to one another so that a product such arrangement has formed in one face thereof a plurality of three-faceted cube corner retroreflective units.

BRIEF SUMMARY OF THE INVENTION

There has now been discovered a technique by which one can prepare reflector mold portions with a plurality of cube corner type retroreflective faceted units formed therein. Such portions are comprised of a plurality of preformed slab-shaped bodies arranged in side-by-side relationship to one another. A product such arrangement has on one face thereof the edge portions of individual such slab-shaped bodies so formed that such combination of such bodies produces a desired or predetermined plurality of three-faceted cube corner retroreflective units in such one face. No individual such slab shaped body by itself has formed in an edge thereof the facet pattern or unit pattern which results when at least two such bodies are placed in adjacent relationship to one another as provided by this invention.

Thus, it is a characteristic of a reflector mold portion of this invention that such is comprised of at least two different slab shaped bodies each of which has formed in an edge thereof at least one and not more than two complete facet types of a predetermined class of three-faceted cube corner retroreflective units, the interrelationship between such two bodies and the respective facets so formed therein being such that when such bodies are placed in a predetermined side-by-side adjacent relationship to one another, such predetermined class of units is generated. As a result, when such a resulting mold portion is incorporated into a reflector mold and a reflector is made therefrom, such product reflector contains molded thereinto retroreflective surfaces derived from such class of units. As those familiar with molding technology will appreciate, the faceted surfaces molded in such a product reflector are reversed in a mirror image fashion from, or in relation to, the surfaces existing in the starting mold portion, characteristically.

By selecting and controlling the size and spatial orientation of individual facets or individual slab shaped bodies, a wide variety of different types of cube corner units can be obtained in any given reflector mold portion of this invention.

It is an outstanding and primary feature of the present invention that at least one, and preferably both, of the slab-shaped bodies comprising a pair of bodies combinable to form cube-corner retroreflective units in accordance with the teachings of this invention has its faceted edge portions formed by direct metal-working techniques (such as grinding, cutting, or the like) without the necessity to first form, individual pins or the like and without the necessity to prepare an electroform body or the like.

Furthermore, and preferably, the faceted edge portions so formed by direct metal working are preferably producable (or produced) by a single metal working step operation, though two or more such operations can be used if desired. Single step facet generation is preferred for reasons of simplicity and accuracy, particularly since the size of individual facets, so far as effective usable area of retroreflectivity in a product individual unit is concerned, is characteristically (though not necessarily) small, being typically less than about 0.3 centimeter in maximum average dimension, and also since the high degree of accuracy desired in making an individual facet, and in making a plurality of individual like facets for a single class of units, is more easily maintained, as those skilled in the art of metal machining will readily appreciate.

Another object of this invention is to provide slab shaped bodies with machined edge portions which can be assembled into retroreflective mold portions.

Another object of this invention is to provide reflector mold portions having a plurality of cube corner type retroreflective molding surfaces formed therein which reflector mold portions are comprised of a plurality of slab shaped bodies.

Another object of this invention is to provide reflector mold portions of the type indicated wherein at least two different types of slab shaped bodies are utilized and wherein one of such types at least has formed in an edge portion thereof a facet pattern which when combined with an adjacent slab shaped body with another but predetermined facet pattern produces a plurality of three-faceted retroreflective units.

Another object of this invention is to provide reflector mold portions for making cube corner type retroreflector surfaces in molded bodies which mold portions can be disassembled into smaller component parts, thereby facilitating replacement, if needed or desirable, of defective or worn areas in such a mold portion.

Another object of this invention is to provide reflector mold portions for which, when incorporated into a mold for making cube corner type reflectors, is adapted to let air or gas escape from corners and pockets thereof during plastic molding operations, even in the case of wide angle cube corner retroreflective units, so that the operational pressure and temperature conditions inherently locally existing in a mold cavity during molding do not result in appreciable mold burning.

Another object of this invention is to provide a system for mounting together a plurality of individual slab shaped bodies of a character as indicated above in a relationship as indicated above in a relationship as indicated above so that the resulting bundle of such body plurality comprises a monolithic structure adapted for incorporation into a mold adapted for the manufacture of particular cube corner type retroreflectors.

Another object of this invention is to provide a system for producing components of molds for cube corner type retroreflectors which components are comprised of a plurality of individual slab shaped bodies which bodies can be made and combined together so as to provide the capability of producing a wide variety of patterns of individual cube corner type retroreflective units, some patterns being presently preferred over other patterns.

Another object of this invention is to provide slab shaped bodies which can be assembled into subassemblies suitable for inclusion into cube corner reflector molds and which are prepared by machining of starting slab shaped bodies by an optimized procedure involving a minimum number of separate or identifiable machining operations, such as grinding, cutting, or the like, per individual product slab shaped body.

Another object of this invention is to provide slab shaped bodies which can be assembled into subassemblies and mold portions that are suitable for inclusion into a cube corner retroreflector mold and which bodies can be prepared either by matching or by a combination of machining and electroforming so that a product subassembly is comprised for example, of both machined bodies, and also electroformed and machined bodies.

The above and other and further features, objects, aims, purposes, advantages and the like will be apparent to those skilled in the art from the present specification taken with the accompanying drawings.

BRIEF DESCRIPTION OF DRAWINGS

In the drawings:

FIG. 1 is an enlarged, fragmentary, perspective view of one slab shaped body used in one embodiment of a mold portion subassembly of the present invention;

FIG. 2 is an enlarged, fragmentary, perspective view of a second slab shaped body used in the same subassembly embodiment;

FIG. 3 is a side elevational view illustrating one method of forming a body of the type shown in FIG. 2, some parts thereof broken away;

FIG. 4 is a side elevational view taken along the lines IV—IV of FIG. 3, some parts thereof broken away;

FIG. 5 is an enlarged fragmentary plan view of one embodiment of a mold portion of this invention which utilizes a plurality of each of the bodies of FIGS. 1 and 2 in alternated, interdigitated configuration;

FIG. 6 is a fragmentary transverse vertical sectional view taken along the line VI—VI of FIG. 5;

FIG. 7 is a fragmentary transverse vertical sectional view through one embodiment of a mold assembly for making a cube corner type retroreflector which mold assembly incorporates a mold portion of the type illustrated in FIGS. 5 and 6;

FIG. 8 is a fragmentary transverse vertical sectional view through a reflector made with the mold assembly of FIG. 7;

FIG. 9 is a view similar to FIG. 2 but showing one slab shaped body used in a second embodiment of a mold portion subassembly of the present invention;

FIG. 10 is a view similar to FIG. 9 but showing a second slab shaped body used in such second subassembly embodiment;

FIG. 11 is a view similar to FIG. 5 but showing an embodiment of a mold portion of this invention which utilizes a plurality of each of the bodies of FIGS. 9 and 10 in alternated interdigitated configuration;

FIG. 12 is a view similar to FIG. 6 but taken along the line XII—XII of FIG. 11;

FIG. 13 is an end elevational view taken along the line XIII—XIII of FIG. 11;

FIG. 14 is an enlarged, fragmentary perspective view of one slab shaped body used in a third embodiment of a mold portion subassembly of the present invention;

FIG. 15 is an enlarged, fragmentary, perspective view of a second slab-shaped body used in such third subassembly embodiment;

FIG. 16 is a view similar to FIG. 3 but illustrating one method of forming a body of the type shown in FIG. 14, some parts thereof broken away;

FIG. 17 is a view similar to FIG. 4 but taken along the line XVII—XVII of FIG. 16;

FIG. 18 is a view similar to FIG. 5 but showing an embodiment of a mold portion of this invention which utilizes a plurality of each of the bodies of FIGS. 14 and 15 in alternated, interdigitated configuration;

FIG. 19 is a view similar to FIG. 6 but taken along the line XIX—XIX of FIG. 18;

FIG. 20 is an end elevational view taken along the line XX—XX of FIG. 18;

FIG. 21 is an enlarged fragmentary perspective view of one slab shaped body used in a fourth embodiment of a mold portion subassembly of the present invention;

FIG. 22 is an enlarged fragmentary perspective view of a second slab-shaped body used in such fourth subassembly embodiment;

FIG. 23 is a view similar to FIG. 5 but showing an embodiment of a mold portion of this invention which utilizes a plurality of each of the bodies of FIGS. 21 and 22 in alternated, interdigitated configuration;

FIG. 24 is a view similar to FIG. 6 but taken along the line XXIV—XXIV of FIG. 23;

FIG. 25 is a fragmentary longitudinal vertical sectional view taken along the line XXV—XXV of FIG. 23;

FIG. 26 is an enlarged fragmentary perspective view of one slab-shaped body used in a fifth embodiment of a mold portion subassembly of the present invention;

FIG. 27 is an enlarged fragmentary perspective view of a second slab shaped body used in such fifth subassembly embodiment;

FIG. 28 is an enlarged fragmentary perspective view of a third slab shaped body used in such fifth subassembly embodiment;

FIG. 29 is a view similar to FIG. 5 but showing an embodiment of a mold portion of this invention which utilizes a plurality of each of the bodies of FIGS. 26, 27 and 28 in alternated, interdigitated configuration;

FIG. 30 is a view similar to FIG. 6 but taken along the line XXX—XXX of FIG. 29;

FIG. 31 is a view similar to FIG. 25 but taken along the line XXXI—XXXI of FIG. 29;

FIG. 32 is a view similar to FIG. 29 but showing an embodiment of a mold portion of this invention which utilizes a plurality of each of the bodies of FIGS. 26, 15 and 27 in alternated, interdigitated configuration;

FIG. 33 is a view similar to FIG. 20 but taken along the line XXXIII—XXXIII of FIG. 32;

FIG. 34 is a view similar to FIG. 31 but taken along the line XXXIV—XXXIV of FIG. 32;

FIG. 35 is a view similar to FIG. 29 but showing an embodiment of a mold portion of this invention which utilizes a plurality of each of a modified body of FIG. 26, a body of FIG. 21, and a modified body of FIG. 28 in alternated interdigitated configuraion;

FIG. 36 is a view similar to FIG. 20 but taken along the line XXXVI—XXXVI of FIG. 35; and FIG. 37 is a view similar to FIG. 8 but showing a reflector made with a mold assembly of the type shown in FIG. 7 but which mold assembly incorporates a mold portion of the type illustrated in FIGS. 35 and 36.

DETAILED DESCRIPTION

Referring to FIGS. 1 through 7, and commencing with FIGS. 1 and 2, there is seen one embodiment of a subassembly for a reflector mold portion, in accordance with the teachings of the present invention, such subassembly being herein designated in its entirety by the numeral 25. The subassembly 25 incorporates two slab shaped bodies 28 and 29, respectively. Each of the bodies 28 and 29, as is characteristic of a subassembly of this invention, has spaced, generally parallel opposed respective side wall portions 31 (paired) and 32 (paired) respecitvely. Each of the bodies 28 and 29 has a top wall 33 and 34, respectively. Each of the bodies 28 and 29 has a bottom edge wall (not detailed, and opposed end walls 36 (paired) and 37 (paired) respectively.

Body 28 has its top edge wall 33 formed as one type of flat first facet surface. As used herein, the term "top edge wall", or "top edge wall portion", or equivalent, has reference to the viewable area of a slab shaped body when seen in top plan. As used herein, the term "facet" or "flat facet", or equivalent has reference to an area or surface which is substantially optically flat. As used herein, the term "facet surface" is usually interchangeable with the word "facet".

In accordance with the teachings of this invention, slab shaped bodies such as bodies 28 and 29 are conveniently made from starting slab-shaped metal stock by machining (typically using cutting and/or grinding) so as to remove a region or regions from such stock, such as for example the region indicated generally by the dotted lines in FIG. 1 from starting stock to form the body 28.

Body 29 has characteristically a plurality of each of a second and a third different types of flat facet surfaces, each such type being numbered for convenience as facets 38 and 39, respectively, formed in its top edge wall 34. Thus, a plurality of individual facets 38 and 39 are formed in such top edge wall 34. Except possibly for terminal facets at opposed end portions of a body 29, each second facet 38 and each third facet 39 is arranged in a paired interrelationship to the other thereof with each such second facet 38 being so configured and so oriented relative to an individual such third facet 39 that each such pair of facets 38 and 39 comprises two facets of an individual cube corner type retroreflective unit as will be explained (for convenience, one representative unit is shown outlined partially by dotted lines in FIG. 5 and such unit is identified in its entirety by the numeral 41). Each one of the second facets 38 and each one of the third facets 39 is equal in area and shape to all others of this class comprising the second and the third facets 38 and 39.

To prepare a slab-shaped body 29 in accordance with a preferred procedure of this invention, slab stock is utilized which has already preliminarily formed therein a uniformly offset end portion in the region adjacent the top edge wall 34. The offset is such that the thickness of the slab between side walls 32 thereof, remains constant. The angle 67 of the offset and the location of angle 67 (or distance of the offset angle 67 from the edge face 34 of body 29 are variables which are determined and chosen in any individual application of the present invention by such considerations as the length of the edges of individual facets 38 and 39, respectively, as well as by the angle at which each of the facets 38 and 39 is inclined with respect to the optical axis 48 of a unit 41, all as those skilled in the art will appreciate.

The manner in which the facets 38 and 39 are formed in a body 29 is illustrated by FIGS. 1 and 4. Here, stock with an offset head, as indicated above, is positioned by a vice or chuck 74 in relation to a revolving grinding wheel 69 so that in effect, kerfs are cut into the edge 34 of slab stock so as to provide the desired configuration for top edge wall 34 in a body 29. The grinding wheel 69 has peripheral side walls 71 and 72 which taper to and meet at a common edge 73. The angle of inclination of side walls 71 and 72 relative to each other and to edge 73 is chosen so that both of the facets 38 and 39 may be cut in a single grinding operation. Thus, by using stock with an offset head and a grinding wheel 69 the slab shaped body 29 is produced in a single machining operation, as is desirable for reasons of accuracy in the fabrication of such a body 29. Stock used for the manufacture of a body 29 can be prepared by conventional means, such as rolling or the like, so that a special preliminary machining operation to produce an offset end region is not necessary, which is desirable in the preferred practice of this invention. A minimum of separate machining operations performed upon a single body, such as body 29, improves the desired accuracy of facet formation in top edge walls 33 and 34, as those skilled in the art will appreciate.

If, however, for reasons of convenience, availability or the like, one desires to use solid slab-shaped starting stock, one can perform a preliminary shaping operation as illustrated in FIG. 3 to produce a blank with an offset head. In such a shaping operation a portion of stock is cut away, as illustrated by the dotted lines in FIG. 3, and thereafter a grinding operation would be commenced with the stock held in a universal vice, 74 or the like, as indicated above.

Characteristcally, all individual ones of, respecitvely, third facets 39, second facets 38, and first facet 33 are further characterized by having one edge thereof coincide with one common side edge of their respective associated such bodies 28 and 29. Thus, edge 42 of each of second facet 38 and edge 43 of each third facet 39 coincides with side edge 46 of body 29, and edge 44 of first facet 33 coincides with edge 47 of body 28.

Characteristically, bodies 28 and 29 are adapted for, and are spatially orientable in, a contacting, adjacent, longitudinally mating, side-by-side relationship relative to the respective adjacent side wall portions 31 and 32 thereof. In such a mating relationship, the third facet surfaces 39, second facet surfaces 38 and first facet surface 33 cooperate to define a plurality of individual cube corner type retroreflective units 41. The units 41 formed by such relationship between the bodies 28 and 29 are characteristically generally longitudinally arranged in an adjacent relationship relative to one another along the adjoining top edge walls 33 and 34 of bodies 28 and 29, respectively. Those portions of edge wall 33 which are used as facet surfaces for the completion of an individual cube corner type retroreflective unit 41 are designated in FIG. 5 as 33A.

Characteristically, each individual cube corner type retroreflective unit, such as a unit 41, is defined by a portion 33A of the first facet surface 33, a second facet surface 38, and a third facet surface 39. Such surfaces 33A, 38 and 39 are arranged circumferentially about an optical axis 48 extending therethrough. The facet surfaces 38, 39 and 33A in a given unit 41 are each inclined at a similar angle 49 relative to the optical axis 48. Also, the facet surfaces 33A, 38 and 39 in any given such cube corner type retroreflective unit 41 meet at an apex point 51 along the optical axis 48. In any given unit 41, the first facet surface 33A thereof is at least equal in area to each of the respective areas of the facet surface 38 and the third facet surface 39 thereof.

Each respective optical axis 48 of all the cube corner type retroreflective units 41 defined by the relationship between the bodies 28 and 29 is disposed substantially parallel to the other axes 48 thereof. Also, each respective apex point 51 of all the cube corner retroreflective units 41 defined by the relationship between the bodies 28 and 29 is disposed substantially coplanar with respect to the other apex points 51 thereof.

A plurality of pairs, each pair being comprised of such slab-shaped bodies 28 and 29, can be assembled into side-by-side aligned relationship with one another so as to produce a reflector mold portion such as portion 26 shown in FIGS. 5 and 6 wherein a plurality of subassemblies are shown, each subassembly being identified as 25A, 25B, 25C, 25D, and 25E. Such a reflector mold portion 26 has the component slab-shaped bodies thereof held together in an aligned relationship with one another by some convenient fastening means. For example, one convenient mode of holding such a plurality of slab-shaped bodies 28 and 29 together in the desired side-by-side relationship to one another is to first drill transversely through each of such bodies a plurality of aligned bores, here illustrated by bore 57. The, through each such bore 57 is extended a rod 58. Adjacent the opposed outside side face of each terminal slab-shaped body in mold portion 26 is positioned a spacer plate (not shown) but see spacer plate 59 in FIG. 7 which, in this combination holds the subassemblies 25 together. All spacer plates are fitted into an embodiment of a mold assembly, such as a mold assembly 62 in FIG. 7, where the plots are located between the structure of mold portion 26 and the adjacent wall 61 of mold assembly 62. The mold assembly 62, except for the mold portion 26, can be considered to be of conventional type and construction generally, as those skilled in the art will appreciate. The assembly of the slab-shaped bodies 28 and 29 with the spacer plates together with the adjacent portions of wall 61 define, substantially, the rear face of a cavity 63 in the mold assembly 62. Separate retaining means for holding the rods 58 in a desired configuration and orientation and position may be provided if desired. Assembly 62 is used to make a reflector 54. A plurality of mold assemblies 62 may be employed in a single molding machine, so that simulatneously a plurality of reflectors, such as reflectore 54, can be produced simulatneously using such mold assemblies.

Characteristically the interrelationship between all facet surfaces 33A, 38 and 39 of any given such unit 41 and the optical axis 48 thereof is such that a ray of incident light, (such as a ray 52) which strikes a predetermined reflector surface (such as the front surface 53 of retroreflective reflector 54 which reflector 54 has been produced by a molding of plastic over the adjoining top edge wall portions 33 and 34 of a subassembly 25) within a predetermined range of incident angles relative to a unit optical axis, and which ray also (in this instance and illustration the ray passes through the reflector 54) strikes one of the facet surfaces of one unit 41 as such is formed in such reflector (here, the reflector 54 has units 41A molded therein) then is deflected successively against the other two of such facet surfaces of such unit (here, the other two facets of a corner type retroreflective unit 41A as such is formed in the reflector 54) and finally is substantially retroreflected away (as from such cube corner type retroreflective unit 41A in the reflector 54 as a retroreflected ray 56.)

An individual such mold assembly 62 fabricated with an incorporated mold portion 26 has the advantage and capacity to vent air therefrom during a molding operation readily, simply, and rapidly. This effect can be aided by providing grooves 64 in bodies 28 and 29 as shown, for example, in FIG. 6. Thus, air escapes through the small sized apertures or grooves 64 existing between individual adjacent slab-shaped bodies 28 and 29 as the mold cavity or mold assembly 62 fills with hot molten plastic fed into the cavity 63 through an orifice (not shown). The grooves 64 can be formed by milling or the like, the mill width being such as to be below the minimum resin fill capacity of a hot plastic mold during a molding operation, as those skilled in the art will readily appreciate. Thus, as those skilled in the art appreciate, the viscosity characteristics typically and conventionally associated with a hot molten plastic resin, such as a polycarbonate resin, or an acrylic resin, or a like resin such as is used conventionally in reflector manufacture, permits such resin to conform to cracks and apertures down to about 0.002 inch while any space between individual slab-shaped bodies, such as bodies 28 and 29 required or desired for venting or air therebetween can be of the order of magnitude smaller that this (that is, on the order of not larger than about 0.005 inch, preferably) in order to achieve an effective venting of air from mold cavities in the region of a cube corner type retroreflective mold portion such as portion 26. If desired, the grooves 64 can be individually formed in such individual slab-shaped bodies, such as bodies 28 and 29, so that when a pair of such bodies are placed together in a side-by-side relationship to form a molding surface as described herein, there is defined desired air passageways; however, care must be taken to make sure that individual air passageways so defined remain preferably usually smaller in dimension than about 0.0015 inch for the above indicated reasons associated with the molding of plastic resinous polymeric material, all as those skilled in the art will appreciate.

Another advantage associated with such mold portions 26 and subassemblies 25, as those skilled in the art will appreciate, is that if by chance a portion of the surface of a mold portion 26 be damaged, the damaged portion can be readily replaced by other slab-shaped bodies without discarding the entire mold portion 26, which is not possible in the prior art when electroform mold portions are employed.

As can be seen, for example, in FIG. 5, a subassembly 25 of the slab-shaped bodies 28 and 29 results in the generation of a plurality of units 41 which utilize most but not all of the surface area provided by the combined top edge wall 33 or body 28. Those portions of top edge wall 33 which are not used in such a unit 41 are designated by the numerals 66 and 76.

In order to provide a higher density of cube corner retroreflective units and to eliminate non reflective areas there is provided, in accordance with the teachings of the present invention, a subassembly 78 comprised of slab-shaped bodies 79 and 81, respectively in FIGS. 9 and 10. Each of these bodies 79 and 81, like bodies 28 and 29, has spaced generally parallel respective side wall portions (paired) with connecting top and bottom edge walls, and opposed end walls (paired).

Each of the individual bodies 79 and 81 is prepared in a manner similar to that used above for the preparation of a body 29 although in the case of the bodies 79 and 81 the height of the sides of the offset portion is greater than in the case of the body 29, for the reason that such changes produce three facets in each unit produced by subassembly 78 which have equal dimensions relative to one another while maintaining equal angles of inclination for each facets in a single unit relative to the optical axis of such unit.

Each of these bodies 79 and 81 has three types of flat facet surfaces defined in its respective top edge wall 84 and 86. In the case of slab shaped body 79, these three types of flat facet surfaces are identified, respectively, by the numerals 87, 88 and 89, while in the case of the slab shaped body 81 each of these flat facet surfaces is identified by the respective numerals 91, 92 and 93. The respective facets 87 and 91 continuously extend longitudinally relative to each of the top edge walls 84 and 86, and each of these facets 87 and 91 is inclined at a constant angle relative to the longitudinally extending central region 94 and 96, respectively, of each top edge wall 84 and 86.

The second respective facet types, individual members of which are numbered 88 and 92 and the third respective facet types, individual members of which are numbered 89 and 93, each comprise a plurality of individual facets. All facets of such respective second facet types 88 and 92, and all facets of such respective third facet types 89 and 93 are inclined relative to the respective first facets 87 and 91 at a similar angle. Also, each respective second type of facet 88 and 92, is inclined at a similar angle to an adjoining facet of such third type (facets 89 and 93). The side edge 97 of each third type of facet 89, and the side edge 98 of each second type of facet 88, and the side edge 99 of each third facet 93 and the side edge 101 of each second facet 92, are all side edges which are generally opposed to the outside edge 102 of first facet 87 and 103 and first facet 91, and all such side edges 97, 98, 99 and 101 overhang or project beyond the main side wall portions of their respective associated bodies 79 and 81.

The interrelationship between the respective slab shaped bodies 79 and 81 is such that, when such are mated together in the manner shown for example in FIGS. 11 and 12, a plurality of individual cube corner type retroreflective units result. Each such unit here formed by such a combination of bodies 79 and 81 into subassembly 78 is defined by the faceted surfaces numbered 92, 93 and 87 in, for example, FIG. 11. Observe that each such unit has individual facets 92, 93 and 87 which are substantially identical to one another in size, shape and angle of inclination to the respective individual optical axes thereof, such as representative axis 104 in FIG. 12.

All regions between adjoining top edge walls 84 and 86 of bodies 79 and 81, respectively, are occupied by facets which are all incorporated into retroreflective cube corner type units, so that there is, in effect, no wasted area from the standpoint of retroreflectivity characteristics associated with edge walls 84 and 86 in subassembly 78, as those skilled in the art will appreciate. In FIGS. 11 and 12, two such subassemblies 78 are shown, each being numbered, for convenience, as subassembly 78A and 78B for differentiation and illustration purposes.

The desired orientation and relationship between bodies 79 and 81 in a mold portion 106, such as depicted in FIGS. 11 and 12, is achieved and maintained in the same manner as utilized in the case of the mold portion 26 shown in FIGS. 5 and 6. Thus, through suitable bores 107 transversely extending between adjoining body 78 and 81 are extended rods 108.

In subassemblies 25 and 78, it will be appreciated that the optical axes 48 and 104 are oriented substantially perpendicularly to the plane defined by the apex points 51 and 109. Consequently, the mold portions 26 and 106 when incorporated into a mold assembly such as mold assembly 62 and used to produce a cube corner type retroreflector such as reflector 54 result in such reflectors 54 or the like wherein the retroreflectivity characteristics of the reflector are comparable to those of conventional so-called "standard" type retroreflectors wherein incident light rays are reflected retroreflectively provided such incident rays reach the surface of a retroreflector at an angle up to about 30° from the respective optical axes associated with the individual molded retroreflective units 41A in such a retroreflector like reflector 54. Because of the maximal utilization of area in a subassembly 78, retroreflectors made incorporating subassemblies 78 have greater retroreflectivity efficiency characteristics than those associated with reflectors made from subassemblies 25, as those skilled in the art will appreciate for comparable areas of retroreflectivity.

Each of the various individual embodiments of this invention illustrated in FIGS. 14 through 36 involve cube corner type retroreflective units whose optical axes are oriented angularly with respect to the respective planes defined by individual apex points thereof. Depending upon the angle of inclination of the optical axes relative to the plane of apex points in each embodiment, a wide variety of different retroreflectivity characteristics may be obtained for a given subassembly of this invention. Retroreflectivity in reflectors made from molds using subassemblies which produce angled optical axes in cube corner type retroreflective units can approach 90° with respect to the plane of apex points. As those skilled in the art will appreciate, such retroreflectivity can be termed "wide angle" type retroreflection in the art.

Thus, for example, there is seen in exploded format in FIGS. 14 and 15 a subassembly 111 comprised of slab-shaped bodies 112 and 113. Each of these bodies 112 and 113, like, for example, bodies 28 and 29, has spaced, generally parallel, respective side wall portions (paired) with connecting top and bottom edge walls, and opposed end walls (paired).

Body 113 (which can be made by techniques similar to those employed for body 28) has two flat facet surfaces 129 and 131 which can be considered to be first facet surfaces. Each surface 129 and 131 longitudinally extends relative to body 113 and is defined on a different opposed side wall portion of body 113 in adjacent relationship to the top edge wall 132.

The preferred techniques employed for the preparation of the individual bodies 112 and 113 are similar to those used above for the preparation of bodies 28 and 29. Thus, specifically, body 112, as illustrated in FIGS. 16 and 17 (which are analogous to FIGS. 3 and 4), is made from a suitably shaped blank starting slab shaped body by a first grinding operation for cutting facet pairs in a top edge thereof, and then is subjected to a second grinding operation to cut another set of facet pairs in such top edge as is illustrated in FIGS. 16 and 17 here; corresponding parts detailed in FIGS. 3 and 4 are similarly numbered in FIGS. 16 and 17 but with the addition of prime marks thereto.

Body 112 has defined in top edge wall 114 thereof two different respective pluralities of individually paired second and third types of flat facet surfaces. In one plurality, the second type of flat facet surfaces are designated by the number 116 while the third type of flat facet surfaces are designated by number 117 (see FIGS. 14 and 18). The second type facets 116 and the third type facets 117 are each arranged in respective paired interrelationships with each individual such second facet 116 being so configured and so oriented relative to an individual such third facet 117 that each such pair of facets 116 and 117 comprises two facets in an individual cube corner type retroreflective unit. Each respective one of such second and third facet surfaces 116 and 117, respectively, is equal in area and shape to all others thereof.

The second plurality is comprised of second facet types 118 and third facet types 119. The facet surfaces 118 and 119 of such second plurality have characteristics like those of the first or original plurality comprised of facets 116 and 117 except that all of the individual second and third type facets 118 and 119 comprising the second plurality or further characterized by having one edge (edge 121 of facet 118 and edge 122 of facet 119) coincide with side edge 123 of body 112. Edge 123 is opposed to edge 124. Edge 124 coincides with an edge of each of the facets 116 and 117 of the first plurality (that is edges 126 of facet 116 and edge 127 of facets 117). All individual such second facets 116 and 118 and such third facets 117 and 119 of their respective pluralities meet along the longitudinally extending central region of body 112.

Thus, body 113 when placed alongside of body 112 defines in combination therewith two different pluralities of individual cube corner type retroreflective units, one such plurality being disposed along edge 124 of body 112, the other being disposed along edge 123 of body 112. Such two pluralities are achieved by disposing a body 113 on each side of body 114. In this way three slab shaped bodies (two bodies 113 and one body 112) generate two separate pluralities of retroreflective cube corner type units. The facets of each cube corner type retroreflector unit in one such plurality are individually identifiable as facets 116, 117 and 129, while the facets defining each unit of the other such plurality are individually identifiable as facets 118, 119 and 131.

The retroreflective units generated by a single subassembly 111 (one body 112 adjacent one body 113) suffer from a disadvantage caused by the fact that each of the facets 116 and 117 relative to facet 129, and each of the facets 118 and 119 relative to the facet 131, are inclined at a slight angle less than 90° relative thereto, so that the optimum 90° relationship in each case is not achieved. Even so, useful retroreflectivity characteristics are achievable in retroreflectors made from molds incorporating subassemblies 111.

To overcome such disadvantage, there is provided herewith optional subassembly 134 which comprises slab shaped bodies 136 and 137 (see FIGS. 21 and 22). In subassembly 111 all facets in each unit are adapted to be at right angles (90°) relative to one another. Thus, in body 137, the facets 138 and 139 thereof are inclined relative to the side walls 141 (paired) of body 137, in contrast to the facets 129 and 131 of body 113 wherein such facets 129 and 131 terminate at 90° relative to the opposed opposite sides of the body 113. In body 137, the facets 138 and 139 can be regarded as forming a part of the top edge wall (bearing in mind the preceding definition of top edge wall). Each of the facets 138 and 139 extends longitudinally relative to the body 137, and each facet 138 and 139 in inclined relative to the other thereof equally along the longitudinally extending central region 143 of body 137.

In slab shaped body 136, the top edge portion 114 of body 136 is transversely or laterally expanded relative to the underlying opposed side walls (paired) of body 136. The angle 147 at which top edge 144 diverges from side walls 146 is equal to the angle 148 in body 137 which is also the angle at which each of the facets 138 and 139 is inclined relative to the side walls 141 (paired) thereof. Thus, when the bodies 136 and 137 are placed in adjacent side by side relationship to one another, body 136 is adapted to mate with body 137. The units formed by the combination of bodies 136 and 137 into a subassembly 134 and which are defined by the combination of such bodies 136 and 137 each has the respective three facets (see subassembly 134A in FIG. 23) 149, 151 and 139A, the number 139A being used to designate that portion of the facet 139 which is used to comprise one of the three facets in an individual completed retroreflective unit.

Observe that the slab shaped body 137 of one subassembly 134A (of a plurality of subassemblies 134; see FIG. 23) coacts with a body 136 of an adjacent subassembly 134B to define a plurality of retroreflective units therebetween. Referring to FIG. 23, it is seen that each of the units thus defined between the subassemblies 134A and 134B extending between the bodies 137 and 136 is defined by facets 153, 152 and 138B (138B being used to designate a portion of facet 138). Observe that the top edge 142 of body 137 is flat and transversely extends normally to the side walls 141 of such body 137; top edge 142 itself is not a part of any single cube corner retroreflective unit in a subassembly 134, but may form in a product molded reflector made therewith a specularly reflective surface as those skilled in the art will appreciate under certain use conditions.

Body 137 can be produced by a conventional machining operation preferably by grinding of a starting sized flat steel plate. Body 136 can be manufactured in the manner similar to that used in the above described for body 112 except that here the opposed sides are milled away to the extent generally shown by the dotted lines in FIG. 121 which mark a starting body's original configuration.

The area of each of the facets 138B and 139A is slightly smaller than each of the areas defined by the respective facets 151, 149, 153 and 152, but only a small loss in cube corner retroreflectivity characteristics is apparently occasioned thereby. By having the top edge 142 of body 137 flattened, retroreflectors formed from subassemblies 134 are more easily removed from a mold incorporating a same than would be the case if the top edge 142 of body 137 ended in a knife-like edge owing to the potential for plastic material hang-ups in such a mold. For similar reasons, a body 113 preferably has a definite thickness, such as is illustrated in FIG. 15.

If desired, a subassembly of this invention can include at least one slab shaped body which in addition to characteristics as herein indicated additionally has defined in a top edge wall thereof a plurality of substantially complete individual second cube corner type retroreflective units arranged generally in a row which extends generally lengthwise along such top edge wall thereof. Such a starting slab shaped body containing such a plurality of second cube corner type retroreflective units can be preliminarily prepared from an electroform body as taught in my copending application Ser. No. 699,886, filed June 25, 1976, the disclosure whereof is hereby incorporated into the present application fully by reference.

For example, a body 113 with its flat face or edge 115 can be replaced by body 156 which additionally had defined in the top edge wall 157 thereof a plurality of second cube corner type retroreflective units arranged generally in a row which extends lengthwise along such top edge wall 157. Because of the faceting associated with individual units in such second cube corner type units, the opposed sides of the body 156 in the region of the top edge 157 are not symmetrical along edge portions. The side of body 156 which is perpendicular is placed in mating adjacent side by side relationship to body 112 (see FIGS. 26 through 28) and this straight side can be considered to correspond to the facet 131 of body 113.

By turning a body 156 end for end so that such body 156 has the orientation shown in FIG. 26 with its flat or straight side 157A adapted for mating adjacent relationship to body 112, another row of cube corner retroreflective units is generated by the combination of body 112 and body 156. Thus, a body 156 so suitably placed on either side of body 112 generates two rows of retroreflective units, in accordance with the teachings of this invention. As those skilled in the art will appreciate, the size of the individual facets preformed in a body 156 are such as to produce complete retroreflective units in edge 157A thereof. Thus, the sizing of facets is such that the peaks 158 between the side edge facet pairs thereof coincide with the side edge facet pair valleys 159 in edge 114 of body 112. Thus, regarding FIGS. 26, 27 and 28 as an exploded view, when these separate bodies 112, 156 are brought together, there is produced a subassembly 161 as shown, for example, in FIG. 29 in plan view. Vertical and horizontal sections of this subassembly 161 are shown in FIGS. 30 and 31. Thus, a plurality of subassemblies 161 can be placed in adjacent side by side relationship to one another so as to comprise a mold portion of this invention, as those skilled in the art will appreciate.

By using other slab shaped bodies with preformed units formed therein analogously to the slab shaped bodies 161, one can prepare a subassembly 162 as shown in FIGS. 35 and 36 wherein slab shaped bodies 163 are comparable to a slab shaped body 137 and subassembly 134 (one in effect being the mirror image of the other, the bodies 163 being paired). Here pluralities of slab shaped bodies 136 are combinable with pluralities of bodies 163 to make a plurality of subassemblies 162 in side by side adjacent placement to one another so as to provide a mold portion of the present invention as those skilled in the art will appreciate.

To avoid having to turn, for example, a slab shaped body 156 end-for-end to produce an appropriate interrelationship between adjacent bodies 112 and 156 as described for subassembly 161, one may insert between the slab shaped bodies 156 and 112 a slab shaped body 113 as shown, for example, in FIGS. 32 and 33. Then there results a subassembly 165 wherein the third slab shaped body 113 has spaced generally parallel respective wall portions with connecting top and bottom edge walls and opposed end walls. Such third body 113 characteristically has at least one type of flat facet surface defined in the region of a top edge wall portion thereof and such third slab shaped body 113 is characteristically adapted for spatial orientation in a contacting, adjacent, longitudinally mating, side-by-side relationship with at least one of the other two slab shaped bodies 156 and 112, thereby to define a separate plurality of individual cube corner type retroreflective units between each of these bodies 156 and 112. Such units comprising such separate plurality are likewise characteristically generally longitudinally arranged in adjacent relationship to one another along their adjoining top edge wall portions. In a subassembly composed of three slab shaped bodies, such as subassembly 165, the third slab shaped body 113 has at least one type of flat facet surface which differs from the types of facet surfaces associated with either one of the other two slab shaped bodies 112 and 156 in at least one characteristic. In subassembly 165, at least one of the three slab shaped bodies 156, 113 and 112 additionally has defined in the top edge wall thereof a plurality of second cube corner type retroreflective units arranged in a row which extends lengthwise along the top edge wall thereof, such one body here being body 156.

Observe that in subassembly 165, subassembly 111, subassembly 134, and subassembly 162, there exists characteristically a plurality of cube corner type retroreflective units has all the optical axes thereof spatially substantially perpendicularly oriented to the plane defined by the set of apex points thereof, and also another plurality of cube corner type retroreflective units defined by a pair of such slab shaped bodies has all the optical axes thereof oriented angularly with respect to the plane defined by its set of apex points.

One class of subassemblies of the present invention can be considered to comprise those wherein a first facet surface in any given group of cube corner type retroreflective units defined by a pair of slab shaped bodies (e.g. a subassembly of this invention) is larger in area than either of the respective surface areas of the second and third facet surface types thereof; see, for example, the embodiment shown in FIGS. 1 through 7.

Reflector mold portions of the present invention characteristically incorporate a plurality of subassemblies of slab shaped bodies, the subassemblies being located in adjacent parallel aligned interdigitated relationship to one another. As explained above, certain of the subassemblies of the present invention can involve a combination of three or more slab shaped bodies, not just two.

In general, a mold assembly of the present invention incorporates a first mold means which utilizes at least one such reflector mold portion which is in combination with rear wall and side wall portions of a cube corner type retroreflector mold. These mold portion(s) are located relative to such other components in such mold so as to comprise a major portion of the rear wall of an individual mold cavity for a reflector. Usually, such a first mold means is employed in combination with a second mold means that is movable towards and away from such first mold means. Such second mold means defines front wall and side wall portions of a reflector mold cavity, and such second mold means cooperates with such first mold means to define therebetween, a reflector mold cavity whose configuration corresponds to that desired for a given reflector. A preferred mold assembly of the present invention incorporates at least two subassemblies of this invention.

Many new and unusual and very useful cube corner type retroreflectors can be prepared from molds made by the practice of the present invention, as those skilled in the art will appreciate.

The claims are:

1. A subassembly for a reflector mold portion, said mold portion being adapted for incorporation into a mold for forming cube-corner type retroreflective surfaces in a body formed by such a mold, said subassembly comprising
   (A) two slab shaped bodies,
   (B) each one of said bodies having spaced, generally parallel respective side wall portions with connecting top and bottom edge walls, and opposed end walls,
   (C) one of said bodies having at least one type of flat first facet surface defined in the region of a top edge wall portion thereof,
   (D) the second of said bodies having a plurality of each of a second and a third different types of flat facet surfaces defined in at least a top edge wall portion thereof, said second and said third facet surface types each being arranged in respective paired interrelationships with each individual such second facet being so configured and so oriented relative to an individual such third facet that each such pair thereof comprises two facets of an individual cube corner-type retroreflective unit, each respective one of said second and said third facet surfaces being equal in area and shape to all others of said second and said third facet surfaces,
   (E) all individual ones of each of said first, said second, and said third facet surface types being further characterized by having one edge thereof coincide with one common side edge of their respective associated said bodies,
   (F) said bodies being adapted for, and spatially orientable in, a contacting, adjacent longitudinally mating, side-by-side relationship relative to respective said side wall portions thereof with all individual ones of each of said, first, said second, and said third facet surface types cooperating to define a plurality of such individual cube corner type retroreflective units, all said units comprising said plurality being generally longitudinally arranged in adjacent relationship to one another along the adjoining said top edge wall portions of said bodies,
   (G) each such individual cube corner type retroreflective unit being defined by one of each of said first, said second, and said third facet surfaces, respectively, which are arranged circumferentially about an optical axis extending therethrough, all of such facet surfaces of any given such cube corner type retroreflective unit being inclined at a generally similar angle relative to said optical axis, and all such facet surfaces of any given such cube corner type retroreflective unit meeting at an apex point along said optical axis, said first facet surface in any given such cube corner-type retroreflective unit being at least equal in area to each of the respective areas of said second and said third facet surface types thereof, the interrelationship between all such facet surfaces of any given such cube corner type retroreflective unit and said optical axis thereof being such that a ray of incident light striking a predetermined surface of a body molded over said adjoining top edge wall portions, and also striking one of the facet surfaces of any given such cube corner type retroreflective unit as such is formed in said molded body within a predeterminable range of incident angles relative to said optical axis thereof as formed in said molded body, is deflected successively against the other two said facet surfaces of such cube corner type retroreflective unit as such is formed in such molded body, and is then substantially retroreflected away from such cube corner type retroreflective unit in said molded body,
   (H) each respective such optical axis of all such cube corner type retroreflective units comprising said plurality being disposed substantially parallel to the other optical axes thereof, and
   (I) each respective such apex point of each such cube corner retroreflective unit comprising said plurality being substantially coplanar with respect to the other apex points thereof.

2. The subassembly of claim 1 further including means securing said two slab shaped bodies together in said relationship.

3. The subassembly of claim 1 incorporating a plurality of pairs, each pair comprising said two slab shaped bodies, said pairs being located in adjacent parallel aligned interdigitated relationship to one another.

4. The subassembly of claim 3 including means securing said pairs together in said relationship.

5. The subassembly of claim 1 wherein all said optical axes are oriented substantially perpendicularly to the plane defined by said apex points.

6. The subassembly of claim 1 wherein said optical axes are oriented angularly with respect to the plane defined by said apex points.

7. The subassembly of claim 3 wherein all said optical axes are orientable substantially perpendicularly to the plane defined by said apex points.

8. The subassembly of claim 3 wherein all said optical axes are oriented angularly with respect to the plane defined by said apex points.

9. The subassembly of claim 1 wherein one of said slab shaped bodies additionally has defined in said top edge wall thereof a plurality of second cube corner type retroreflective units arranged generally in a row which extends lengthwise along said top edge wall thereof.

10. The subassembly of claim 1 wherein said second slab shaped body additionally has defined in said top edge wall a second plurality of each of said second and said third types of flat facet surfaces, the facet surfaces of said second plurality having characteristics like those of such original plurality except that all individual said second and said third facets comprising said second plurality are further characterized by having one edge thereof coincide with the common side edge of their associated such body which is opposed to said one common side edge coinciding with the facets of said original plurality, all individual said second and said third facets of each of said original plurality and said second plurality meeting along the longitudinally extending central region of their associated such body.

11. The subassembly of claim 10 wherein said one slab shaped body has two flat facet surfaces, each one longitudinally extending relative to said one body and being defined on a different opposed side wall portion of said one slab shaped body in adjacent relationship to said top edge wall thereof, thereby adapting said one slab shaped body to define in combination with each of said second slab shaped bodies, one located on each opposed side of said one slab shaped body, two different pluralities of such individual cube corner type retroreflective units.

12. The subassembly of claim 10 wherein said one slab shaped body has two flat facet surfaces defined in said top edge wall, each one extending longitudinally relative to said one body and each one being inclinded relative to the other thereof equally along the longitudinally extending central region of their associated said body, and wherein also said second slab shaped body additionally has its said top edge portion transversely expanded relative to underlying transverse thickness between side wall portions thereof thereby permitting said one slab shaped body to define in combination with said second slab shaped body substantially equal angles of inclination for each of the facet surfaces comprising every individual cube corner type retroreflective unit of a said plurality thereof.

13. A subassembly of claim 1 wherein each of said slab shaped bodies has three types of flat facet surfaces defined in a respective top edge wall portion thereof, a first of said facet types continuously extending longitudinally relative to each said top edge wall portion and being inclined at a constant angle relative to the longitudinally extending central region of each said top edge wall portion, the second and the third of said facet surface types each comprising a plurality of individual facets all facets of said second and said third types being inclined relative to said first facet type at a similar angle, each facet of said second type being inclined at a similar angle to an adjoining facet of said third type, the side edge portions of facets of said second and said third type which are generally opposed to the outside edge of said first facet overhanging beyond their adjacent side wall portions of their respective associated said body, the interrelationship between said slab shaped bodies being such that, when same are mated together, said plurality of individual cube corner type retroreflective units which result all have individual facets which are substantially identical to one another in size, shape, and angle of inclination to said respective optical axes thereof, and all regions between adjoining said top edge wall portions of respective associated said bodies being occupied by facets which are all incorporated into said retroreflective units.

14. The subassembly of claim 11 wherein said one slab shaped body additionally has defined in said top edge wall thereof a plurality of second cube corner type retroreflective units arranged generally in a row which extends lengthwise along said top edge wall thereof.

15. The subassembly of claim 12 wherein said one slab shaped body additionally has defined in said top edge wall thereof a plurality of second cube corner type retroreflective units arranged generally in a row which extends lengthwise along said top edge wall thereof.

16. A subassembly of claim 1 wherein a third slab shaped body is provided, said third slab shaped body having spaced, generally parallel respective side wall portions with connecting top and bottom edge walls, and opposed end walls, said third slab shaped body having at least one type of flat facet surface defined in the region of a top edge wall portion thereof said third slab shaped body being adapted for, and spatially orientable in, a contacting, adjacent, longitudinally mating, side-by-side relationship with at least one of said two slab shaped bodies to define a separate plurality of such individual cube corner-type retroreflective units, said units comprising said separate plurality being generally longitudinally arranged in adjacent relationship to one another along adjoining said top edge wall portions.

17. The subassembly of claim 16 wherein said third slab shaped body has at least one type of flat facet surface which differs from the types of facet surfaces associated with either one of said two slab shaped bodies in at least one characteristic.

18. The subassembly of claim 17 wherein one of said three slab shaped bodies additionally has defined in said top edge wall thereof a plurality of second cube corner type retroreflective units arranged in a row which extends lengthwise along said top edge wall thereof.

19. The subassembly of claim 17 wherein each of two of said three slab shaped bodies additionally has defined in said top edge wall thereof a plurality of second cube corner type retroreflective units arranged in a row which extends lengthwise along said top edge wall thereof.

20. The subassembly of claim 16 wherein one plurality of cube corner type retroreflective units thereof has all the optical axes thereof oriented substantially perpendicularly to the plane defined by the apex points thereof and another plurality of cube corner type retroreflective units thereof defined by a pair of said slab shaped bodies has all the optical axes thereof oriented angularly with respect to the plane defined by said apex points.

21. The subassembly of claim 1 wherein said first facet surface in any given such cube corner type retroreflective unit is larger in area than each of the respective areas of said second and said third facet surface types thereof.

22. The apparatus of claim 21 wherein at least one of said slab shaped bodies is preliminarily offset to an extent in the region of the top edge thereof.

23. A reflector mold portion adapted for incorporation into a mold for forming cube corner type retroreflective surfaces in a body formed by such a mold, said reflector mold portion comprising a plurality of pairs of slab shaped bodies, said pairs being located in adjacent parallel aligned interdigitated relationship to one another, each one of said pairs being comprised of a subassembly as defined in claim 1, and means for securing said pairs together.

24. A mold assembly comprising
(A) a first mold means defining the rear wall and side wall portions of a cube corner type retroreflector, said first mold means having incorporated thereinto a mold portion of claim 22, the relationship between said first mold means and said mold portion being such that said mold portion is so located relative to said first mold means that said mold portion defines a major portion of said rear wall, and (B) a second mold means defining the front wall and side wall portions of said retroreflector, said second mold means cooperating with said first mold means to define between said front wall and said rear wall a mold cavity whose configuration corresponds to that desired for said retroreflector.

25. The mold assembly of claim 24, wherein said mold portion includes at least two different classes of cube corner type retroreflective units.

* * * * *